United States Patent [19]

Stecklein

[11] 4,004,855
[45] Jan. 25, 1977

[54] ARTICULATED JOINT INCLUDING SEALS MAINTAINED BY WEDGE

[75] Inventor: Gary Lee Stecklein, Dubuque, Iowa

[73] Assignee: Deere & Company, Moline, Ill.

[22] Filed: May 21, 1976

[21] Appl. No.: 688,674

[52] U.S. Cl. .............................. 403/158; 403/288;
403/409; 172/273; 277/236

[51] Int. Cl.² ...................................... F16C 11/00

[58] Field of Search .......... 403/147, 149, 158, 161,
403/162, 146, 148, 157, 288, 79, 409; 277/95,
236; 172/273, 762; 308/244, 237 A, 237 R;
37/118 A, 118 R, 117.5

[56] References Cited

UNITED STATES PATENTS

| 2,772,596 | 12/1956 | Trussell | 308/244 |
|---|---|---|---|
| 3,050,346 | 8/1962 | Simpson et al. | 305/11 |
| 3,543,863 | 12/1970 | Helton | 172/273 |
| 3,554,587 | 1/1971 | Baker et al. | 403/157 |
| 3,554,588 | 1/1971 | Reinsma et al. | 403/154 |

Primary Examiner—Andrew V. Kundrat

[57] ABSTRACT

A first member is disposed between and pivotally connected to a pair of spaced apart parallel portions of a second member through means of a pivot pin extending through axially aligned holes respectively located in the first member and in the parallel portions of the second member. The hole in the first member has a bushing located therein which is shorter than the hole, and first and second pairs of opposed Belleville springs are received on the pin and are respectively compressed into the hole at the opposite ends of and into sealing engagement with the opposite ends of the bushing through means of first and second pairs of wedge pieces respectively interposed between opposite sides of the first member and the parallel portions of the second member.

10 Claims, 6 Drawing Figures

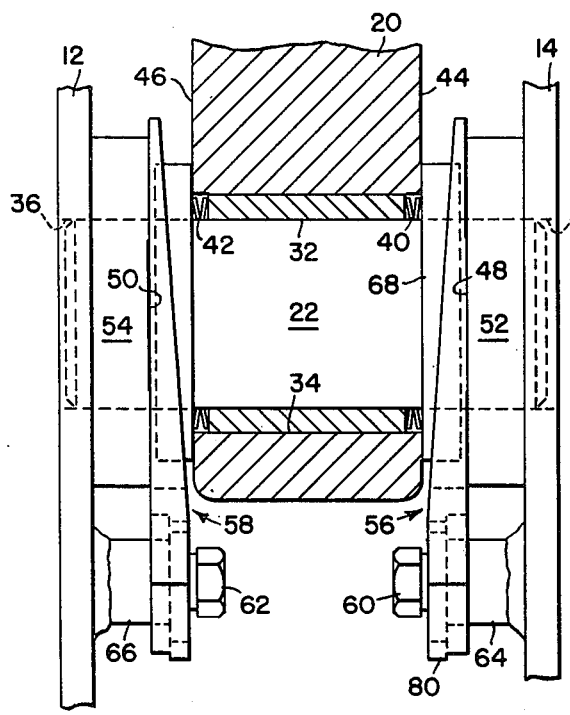
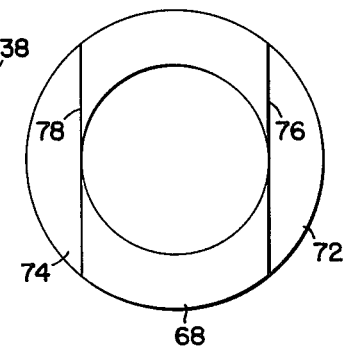
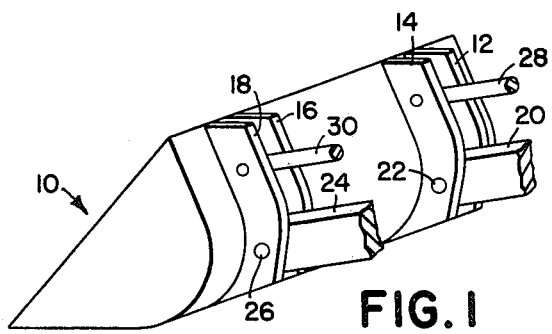
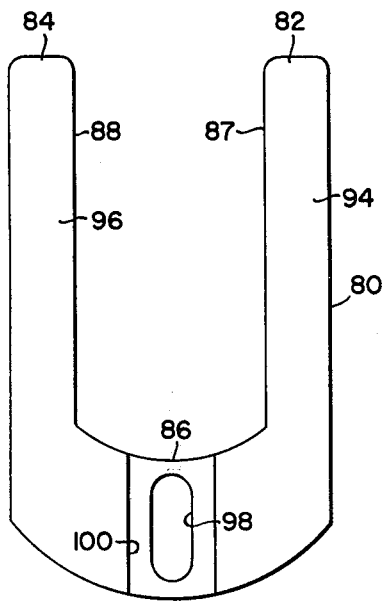
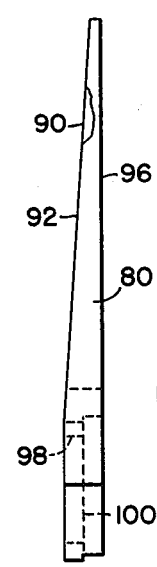

ARTICULATED JOINT INCLUDING SEALS MAINTAINED BY WEDGE PIECES

BACKGROUND OF THE INVENTION

The present invention relates to an articulated connection or joint which embodies seals formed by opposed pairs of Belleville springs and more particularly relates to an articulated connection of the type formed by interposing a first member between and pivotally connecting it to spaced apart parallel portions of a second member by means of a pivot pin extending through axially aligned holes located in the first member and in the parallel portions of the second member.

The use of pairs of opposed Belleville springs as seals for preventing foreign material from entering between a pivot pin and a bushing in an articulated connection is known. However, because the effectiveness of Belleville springs as seals depends upon the opposed pairs thereof being installed under a predetermined amount of compression, such use of Belleville springs has heretofore been restricted to articulated connections where the manufacturing tolerances of the members to be connected together are such as to ensure the nominal gap between those parts between which the springs are to be installed is maintained small enough to keep the springs properly compressed. One area where the use of Belleville springs as seals has become popular is in the articulated connections between the links of tracks for track-laying tractors. U.S. Pat. No. 3,050,346 issued to Simpson et al on Aug. 21, 1962 discloses a track hinge connection wherein such a use of Belleville springs is exemplified.

SUMMARY OF THE INVENTION

According to the present invention there is provided an improved articulated connection or joint embodying Belleville springs as seals and more particularly there is provided an articulated joint constructed so that compensation for manufacturing tolerances can be made during installation of the Belleville springs so as to ensure the necessary compression of the latter to effect an effective seal.

A broad object of the invention is to provide an articulated connection construction which permits the use of Belleville springs as seals even though the parts from which the connection is constructed are not built to the close tolerances that have heretofore been necessary to ensure the compression of the Belleville springs required for effecting sealing.

A more specific object of the invention is to provide an articulated connection wherein the nominal gap between the parts of the connection can be adjusted during assembly of the connection.

Another object of the invention is to provide an articulated connection formed by interposing a first member between a pair of parallel portions of a second member and to adjust the nominal gap between the first and second members by interposing first and second pairs of wedge pieces respectively between opposite sides of the first member and the pair of parallel portions of the second member.

These and other objects of the invention will become apparent from a reading of the following description in conjunction with the appended drawings.

BRIEF DESCRIPTION OF THE DRAWINGS

FIG. 1 is a left rear perspective view showing a loader bucket pivotally connected to the forward ends of a pair of loader lift arms by means embodying the principles of the present invention.

FIG. 2 is a view, partially in section, showing the details of one of the pivotal connections illustrated in FIG. 1.

FIG. 3 is a detailed view of the inner right wedge piece appearing in FIG. 2.

FIG. 4 is a right side view of the wedge piece shown in FIG. 3.

FIG. 5 is a detailed view of the outer right wedge piece appearing in FIG. 2.

FIG. 6 is a right side view of the wedge piece shown in FIG. 5.

DESCRIPTION OF THE PREFERRED EMBODIMENT

Referring now to FIG. 1, therein is shown a loader bucket 10 including, as integral portions thereof, a right pair of parallel spaced apart right and left flanges 12 and 14 and a similar left pair of right and left flanges 16 and 18. A right loader lift arm 20 has its forward end located between and pivotally connected to the right pair of flanges 12 and 14 by a pivot pin 22 positioned in aligned holes in the arm 20 and flanges 12 and 14 on a left arm 24 is similarly connected to the left pair of flanges 16 and 18 by a pivot pin 26. Also visible in FIG. 1 are portions of right and left tilt linkages 28 and 30, respectively, which are respectively connected to the right and left pairs of flanges.

As the connections between the right and left lift arms 20 and 24 and the bucket 10 are identical, only the connection of the right arm 20 to the bucket 10 is illustrated and described in detail.

Thus, with reference to FIG. 2, the pivot pin 22 extends through a bushing 32 positioned in a hole 34 passing through the arm 20, the opposite ends of the pin 22 respectively terminating in holes 36 and 38 respectively located in the flanges 12 and 14. The bushing 32 is a predetermined amount shorter than the hole 34 and a first pair of opposed Belleville springs 40 are sealingly compressed into the right end of the hole 34 and against the right end of the bushing 32, and a second pair of opposed Belleville springs 42 are sealingly compressed into the left end of the hole 34 and against the left end of the bushing 32.

The lift arm 20 has opposite planar side surfaces 44 and 46 which respectively extend in parallel facing relationship to planar inner surfaces 48 and 50 respectively of a pair of ring-like bosses 52 and 54 respectively forming parts of the flanges 14 and 12; and the two pairs of springs 40 and 42 are respectively held in their compressed states by means of a pair of identical wedge assemblies 56 and 58 respectively interposed between the surfaces 44 and 48, and between the surfaces 46 and 50, the assemblies 56 and 58 respectively being held in place, in a manner hereinafter described, by a pair of cap screws 60 and 62 respectively received in threaded bosses 64 and 66 respectively welded to the insides of the flanges 14 and 12. Inasmuch as the assemblies 56 and 58 are identical, only the assembly 56 is mentioned in the detailed description below with it being understood that the description also applies to the assembly 58.

Thus, the wedge assembly 56 includes an inner washer-like wedge piece 68 mounted on the pin 22 and having a planar inner surface 70 (FIG. 3) engaged with the planar side surface 44 of the lift arm 20 and with the outer one of the pair of Belleville springs 40.

As can best be seen in FIGS. 3 and 4, the face of the wedge piece 68, facing away from the arm 20 in FIG. 2, has diametrically opposite recessed sections respectively defining a pair of outwardly facing coplanar surfaces 72 and 74 inclined relative to the inner surface 70, and defining a pair of parallel surfaces 76 and 78 facing oppositely from the pin 22.

The wedge assembly 56 further includes an U-shaped outer wedge piece 80 including a pair of parallel spaced legs 82 and 84 joined by a bright portion 86. The wedge piece 80 is mounted with the legs 82 and 84 disposed in straddling relationship to the pin 22, the legs 82 and 84 respectively including surfaces 87 and 88 facing the pin 22 in parallel opposed relationship to each other and respectively disposed against the surfaces 76 and 78 of the wedge piece 68 to thereby prevent the latter from rotating on the pin 22 relative to the wedge piece 80.

Further, the legs 82 and 84 respectively include coplanar surfaces 90 and 92 (FIG. 5), which face inwardly toward the arm 20 in FIG. 2 and are inclined complimentary to and engaged with the surfaces 72 and 74 of the wedge piece 68, and include outer coplanar surfaces 94 and 96 which bear against the inner surface 48 of the boss 52.

A mounting hole 98 is located centrally in the bight portion 86 of the wedge piece 80 and is elongated in a direction parallel to the legs 82 and 84. The outer surface of the bight portion 86 is traversed by a centrally located recess 100 that receives the outer end of the threaded boss 64. The cap screw 60 extends through the hole 98 and retains the wedge piece 80 in place relative to the wedge piece 68, it being noted that the hole 98 will permit the wedge piece 80 to be adjusted relative to the wedge piece 68 when the cap screw 60 is loosened.

While the invention is here described as being embodied in a connection between a bucket and a lift arm, it will be appreciated that the invention may be applied to any joint formed between a first member and spaced apart mounting parts of a second member. Also, while the U-shaped wedge pieces are here disclosed as being connected to the spaced apart mounting parts, they may instead be connected to the opposite sides of the member located between the mounting part without compromising the effectiveness of the invention.

The operation of the invention is thought to be apparent from the description given above, and for the sake of brevity, no further description of the operation is given.

I claim:

1. In an articulated connection between first and second members, the first member including a pair of parallel portions disposed on opposite sides of and pivotally interconnected to the second member by a pivot pin assembly including aligned holes located in the pair of parallel portions and the second member and a bushing located in the hole of the second member and receiving a pin extending into the holes in the pair of parallel portions, and seal means for preventing abrasive material from entering between the pin and bushing, the improvement comprising: said bushing being a predetermined length less than the length of the hole in said second member, first and second pairs of opposed Belleville springs located in the last named hole at opposite ends of the bushing and having a combined uncompressed length greater than said predetermined length less than the length of the hole; and first and second wedge means respectively interposed between the pair of parallel portions and the second member and respectively engaging one of each of said first and second pairs of Belleville springs and maintaining said first and second pairs of Belleville springs in a compressed state within the length of the hole in the second member.

2. The articulated connection defined in claim 1, wherein each of said first and second wedge means includes inner and outer wedge sections respectively having opposed complimentary surfaces engaged with each other and inclined relative to a plane disposed perpendicular to said pin; said inner and outer wedge sections further respectively including inner and outer surfaces engaged with the second member and a respective one of the pair of parallel portions of the first member; and securing means for preventing relative movement between the inner and outer wedge sections.

3. The articulated connection defined in claim 1, wherein each of said first and second wedge means includes inner and outer wedge sections respectively having, with reference to a plane disposed perpendicular to the pin, complimentary inclined surfaces engaged with each other and inner and outer parallel surfaces engaged with the second member and a respective one of the pair of parallel portions; said inner wedge section having a hole receiving said pin; said outer wedge section being bifurcated and disposed with its furcations extending on opposite sides of the pin; said outer wedge section including an opening elongated in the direction of the inclines of said inclined surfaces and screw fastener means received in said opening and holding the outer wedge section in position relative to the inner wedge section.

4. The articulated connection defined in claim 3, wherein each of said inner wedge sections includes oppositely facing surfaces engaged with opposed surfaces of the furcations of a respective outer wedge section so as to prevent the inner wedge sections from rotating relative to the outer wedge sections.

5. In an articulated connection between a first member having spaced apart first and second parallel portions located on opposite sides of a second member wherein the connection includes first, second, and third axially aligned holes respectively located in said first and second portions and said second member; a bushing located in the third hole and a pin extending through the bushing and into the first and second holes and seal means for preventing the entrance of abrasive material between the pin and bushing, the improvement comprising: said bushing being a predetermined length less than the length of the third hole; first and second axially deformable seals received on the pin and respectively engaged with the opposite ends of the bushing; said seals having an uncompressed length which when added to the length of the bushing is greater than the length of the third hole; and first and second wedge means respectively interposed between the first and second portions of the second member and the first and second seals for compressing the latter completely into said third hole.

6. The articulated connection defined in claim 5 wherein said first and second axially compressible seals are first and second pairs of opposed Belleville springs.

7. The articulated connection defined in claim 5 wherein each of said first and second wedge means includes a washer-like first member and a generally U-shaped second member; said washer-like member being received on the pin and having a first surface engaged with a respective one of said axially compressible seals and having an opposite, inclined second surface; said U-shaped member having opposite legs straddling the pin and provided with respective inclined surfaces formed complimentary to and engaged with the inclined surface of a respective washer-like member.

8. The articulated connection defined in claim 5, wherein each of said first and second wedge means includes inner and outer wedge sections respectively having opposed complimentary surfaces engaged with each other and inclined relative to a plane disposed perpendicular to said pin; said inner and outer wedge sections further including inner and outer surfaces engaged with the second member and a respective one of the pair of parallel portions of the first member; and securing means for preventing relative movement between the inner and outer wedge sections.

9. The articulated connection defined in claim 5, wherein each of said first and second wedge means includes inner and outer wedge sections respectively having, with reference to a plane disposed perpendicular to the pin, complimentary inclined surfaces engaged with each other and inner and outer parallel surfaces engaged with the second member and a respective one of the pair of parallel portions of the first member; said inner wedge sections having a hole receiving said pin; said outer wedge section being bifurcated and disposed with its furcations extending on opposite sides of the pin; said outer wedge section including an opening elongated in the direction of the inclines of said inclined surfaces and screw fastener means received in said opening and holding the outer wedge section in position relative to the inner wedge section.

10. The articulated connection defined in claim 9 wherein each of said inner wedge sections includes oppositely facing surfaces engaged with opposed surfaces of the furcations of a respective outer wedge section so as to prevent the inner wedge sections from rotating relative to the outer wedge sections.

* * * * *